March 30, 1926.  W. WERNER  1,578,304
FERRULE
Filed May 21, 1924
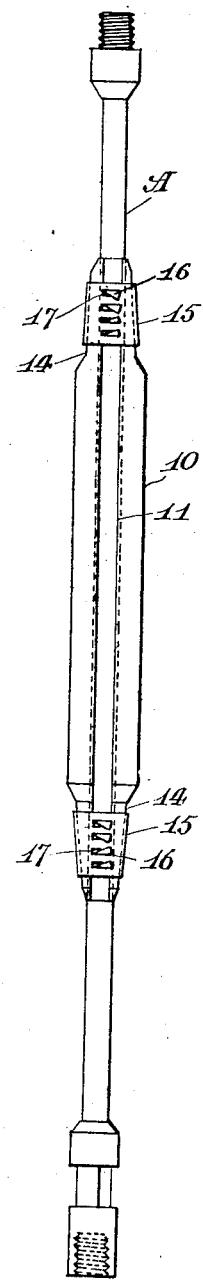
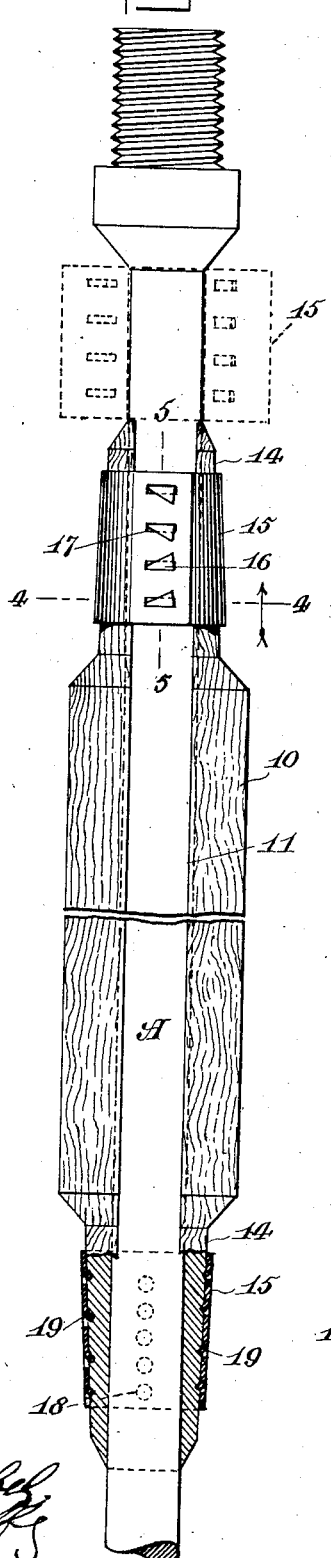
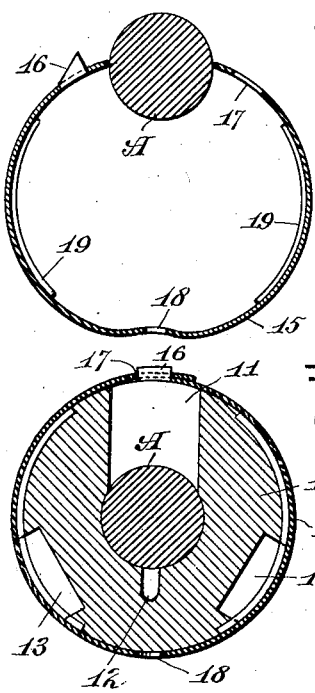
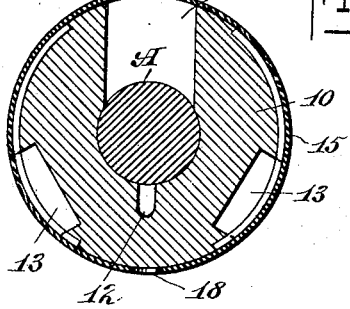
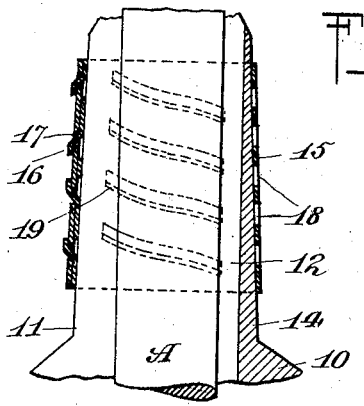
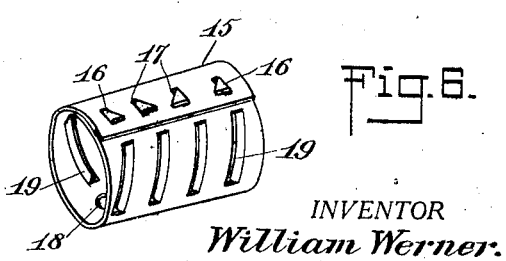
INVENTOR
William Werner.
WITNESSES
BY
ATTORNEYS Patented Mar. 30, 1926.

1,578,304

UNITED STATES PATENT OFFICE.

WILLIAM WERNER, OF CORSICANA, TEXAS, ASSIGNOR TO MEXIA PLANING MILL COMPANY, OF MEXIA, TEXAS, A CORPORATION OF TEXAS.

FERRULE.

Application filed May 21, 1924. Serial No. 714,987.

*To all whom it may concern:*

Be it known that I, WILLIAM WERNER, a citizen of the United States of America, and a resident of Corsicana, in the county of Navarro and State of Texas, have invented new and Improved Ferrules, of which the following is a description.

My invention relates to a friction reducer more particularly intended for use on drill rods or cables of oil wells and particularly to a wooden friction reducer and means to clamp the same firmly on the rod or cable.

The general object of my invention is to provide a friction reducer generally of cylindrical form and elongated to provide ample surface to contact with the well casing and having clamping means associated therewith, the two being of a character to facilitate the firm clamping of the friction reducer to the rod or cable at any point along the same as well as providing for the ready removal of the friction reducer and its clamp means.

The nature of my invention and its distinguishing features and advantages will clearly appear as the description proceeds.

Reference is to be had to the accompanying drawings forming a part of this specification it being understood that the drawings are merely illustrative of one example of the invention.

Figure 1 is a side elevation of a drill rod section having my improved friction reducer applied thereto;

Figure 2 is an enlarged view partly in elevation and partly in vertical section of a portion of the drill rod and the friction reducer;

Figure 3 is a horizontal section through the clamp and drill rod showing the manner of applying the clamp to the rod above or below the friction reducer preparatory to movement of the clamp axially on to an end of the friction reducer;

Figure 4 is a section through the clamp, an end of the friction reducer and drill rod section as indicated by the line 4—4, Figure 2;

Figure 5 is a detail in vertical section as indicated by the line 5—5, Figure 2;

Figure 6 is a perspective view of one of the clamps.

In carrying out my invention in accordance with the illustrated example an elongated friction reducer 10 of wood fiber composition or the like is provided having a longitudinal slot 11 in a side thereof of a size to permit said friction reducer to be applied to a drill rod A by a sidewise movement at any zone along the rod or along a cable. At the interior of the friction reducer 10 is a vertical slot 12 complementary to the side slot 11 to produce a weakened line in the reducer whereby to lend flexibility to the same to bring about an effective clamping with the drill rod. Also, at the exterior of the friction reducer 10 are vertical slots 13 for the flow of water and matter carried thereby. The slot 11 serves also for the flow of water and the matter carried thereby and unless there is a very material flow of the water, the slot 11 will suffice without the slots 13. The upper and lower ends 14 of the friction reducer 10 are tapered to give a wedging or tightening action to the clamps.

The clamps designated generally by the numeral 15 are in the form of split bands having a vertical series of fastening tongues 16 stamped up from the material of the clamp 15 at one edge thereof. Adjacent to the opposite edge of clamp band 15 I form therein a series of openings 17 corresponding with the series of fastening tongues 16 and through which said fastener tongues may be passed and then bent downwardly to hold the band against expansion. The band is applied to the drill rod A or cable above or below the adjacent tapered end 14 of the friction reducer 10 as for example as indicated by the dotted lines in Figure 2 and the fasteners 16 are then engaged in the holes 17. The clamp band is then slipped along the rod longitudinally and onto the adjacent tapered end 14, the taper serving to wedge the clamp 15 tightly in position, the friction reducer by reason of the side opening 11 and internal longitudinal slot 12 yielding to the tightening action of the clamp band 15 and thereby taking firm hold on the rod A or cable.

To lend flexibility to the clamp 15 I provide a weakened line therein diametrically opposite the split or opening in the band. In the illustrated example the said line is produced by forming a vertical series of holes 18 in the clamp bands. Also, in order to increase the gripping action of the clamp bands 15 on the ends 14 of the friction reducer, the sides of the bands at the interior are formed with ribs 19 following the transverse curvature of the bands, said ribs being stamped out of the material of the bands and in practice advantageously disposed along spiral lines as clearly indicated in Figures 5 and 6.

The longitudinal slot 11 and the auxiliary grooves 13 functioning as described are not claimed broadly in the present application as these form part of the subject matter of an application filed by me August 7, 1923, Serial Number 656,209.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A ferrule comprising a band of sheet metal bent to surround a compressible member, said band having a line of holes adjacent one of the meeting edges thereof and tongues on the opposite edge adapted to be received in said openings and to be bent laterally to secure said band in clamping relation upon said member.

2. A ferrule comprising a band of sheet metal bent to surround a compressible member, said band having a series of slotted openings formed adjacent one of the meeting edges thereof, said openings being formed at right angles to said edges and fastening tongues on the opposite edge adapted to be received in said openings and to be bent in a direction longitudinal of said band, in the manner described.

3. A clamping ferrule in the form of a split band provided near one edge with bendable fastening tongues and near the other edge with corresponding openings to receive said tongues.

4. A clamping ferrule in the form of a split band provided near one edge with bendable fastening tongues and near the other edge with corresponding openings to receive said tongues, said ferrule being tapered from one end thereof toward the other.

5. A clamping ferrule in the form of a split band, said band having a series of internal ribs adapted to engage a compressible member, said band being provided near one edge with bendable fastening tongues thereon and having co-operative openings in the other edge to receive said tongues.

6. A clamping ferrule in the form of a split band provided near one edge with tongues formed by partially cutting out and bending up portions of said bands transversely thereof, said bands having openings on the other edge to receive said tongues, and spirally disposed internal ribs on said bands for the purpose as described.

WILLIAM WERNER.